United States Patent [19]
Natoli et al.

[11] Patent Number: 5,585,412
[45] Date of Patent: Dec. 17, 1996

[54] PROCESS FOR PREPARING FLEXIBLE CFC-FREE POLYURETHANE FOAMS USING AN ENCAPSULATED BLOWING AGENT

[75] Inventors: Frank S. Natoli, Hamden; Kiran B. Chandalia, Cheshire, both of Conn.

[73] Assignee: Olin Corporation, Cheshire, Conn.

[21] Appl. No.: 786,631

[22] Filed: Nov. 1, 1991

[51] Int. Cl.$^6$ .................... C08J 9/08; C08J 9/00; C08J 9/12

[52] U.S. Cl. .............. 521/126; 252/182.24; 252/182.25; 252/307; 252/350; 521/76; 521/127; 521/133; 521/159

[58] Field of Search .......... 252/182.24, 182.25, 252/307, 350; 521/76, 159, 126, 127, 133

[56] References Cited

U.S. PATENT DOCUMENTS

| | | | |
|---|---|---|---|
| 2,834,748 | 5/1958 | Bailey et al. | 252/49.6 |
| 3,455,848 | 7/1969 | Yoncoskie et al. | 521/76 |
| 3,466,353 | 9/1969 | Turner | 521/76 X |
| 3,772,218 | 11/1973 | Lamplugh et al. | 252/182.24 X |
| 3,833,526 | 9/1974 | Cear et al. | 252/182.24 X |
| 4,014,809 | 3/1977 | Kondo et al. | 252/182.24 |
| 4,352,896 | 10/1982 | Kopp et al. | 521/118 |
| 4,417,998 | 11/1983 | Kennedy | 252/182.24 |
| 4,442,235 | 4/1984 | Taylor et al. | 521/122 |
| 4,965,029 | 10/1990 | Lidy et al. | 264/45.1 |

*Primary Examiner*—Richard D. Lovering
*Attorney, Agent, or Firm*—Dale L. Carlson

[57] ABSTRACT

The present invention relates to a process for producing a flexible polyurethane foam by reacting, at a reaction temperature within a temperature range of between about 70° F. and about 150° F., a reaction mixture comprised of a polyol, an organic isocyanate, water, an encapsulated blowing agent, and a reaction catalyst, wherein the encapsulated blowing agent comprises a shell and a core, said shell comprising a polymer having a melting point above the initial reaction temperature, and said core comprising a gaseous blowing agent or blowing agent precursor for blowing said reaction mixture at said reaction temperature. In another aspect, the present invention relates to a process for cooling a hot polyurethane foam utilizing encapsulated water contained in the foam forming reaction mixture.

6 Claims, No Drawings

PROCESS FOR PREPARING FLEXIBLE CFC-FREE POLYURETHANE FOAMS USING AN ENCAPSULATED BLOWING AGENT

FIELD OF THE INVENTION

This invention relates generally to polyurethane foams, and, more specifically, to the preparation of CFC-free flexible polyurethane foams using an encapsulated blowing agent.

BACKGROUND OF THE INVENTION

In the production of polyurethane foams, a polyol is reacted with a polyisocyanate in the presence of a polyurethane catalyst and a blowing agent. Unfortunately, certain blowing agents, namely chlorofluorocarbons (so-called "CFCs"), are hazardous to the environment, specifically the ozone layer of the stratosphere. Hence, alternatives to the use of CFC's are being actively sought by the polyurethanes community.

Certain alternatives to the use of CFC's in the preparation of flexible polyurethane foams are known in the art. By way of illustration, methylene chloride has been used in conjunction with water as blowing agents to produce the desired foam. Unfortunately, methylene chloride has been determined to be a volatile organic acid, and therefore it is not desireable for use as a blowing agent. Other alternatives to the use of CFC's that do not involve the use of volatile organics or carcinogens would be highly desired by the flexible urethanes community. In the past, CFC-free, so-called "all-water-blown" foams tend to scorch and/or be firmer than might otherwise be desired at relatively low densities. Heretofore, suitable alternatives have not been known based upon the knowledge of the present inventors.

SUMMARY OF THE INVENTION

In one aspect, the present invention relates to a process for producing a flexible polyurethane foam by reacting, at an initial reaction temperature selected from within a temperature range of between about 70° F. and about 150° F. (preferably 70° F.–120° F.), a reaction mixture comprised of a polyol, an organic isocyanate, water, an encapsulated blowing agent, and a reaction catalyst, wherein the encapsulated blowing agent comprises a shell and a core, said shell comprising a polymer having a melting point above the inital reaction temperature (preferably between about 100° F. and about 250° F.) and said core comprising a gaseous blowing agent or blowing agent precursor for blowing said reaction mixture at said reaction temperature. Preferably, the core of said encapsulated blowing agent is a gas selected from the group consisting of carbon dioxide, nitrogen, air, and combinations thereof.

In another aspect, the present invention relates to a process for producing a flexible polyurethane foam which comprises the steps of:

(a) reacting, at an initial reaction temperature selected from within a temperature range of between about 70° F. and about 150° F. (preferably 70° F.–120° F.), a reaction mixture comprised of a polyol, an organic isocyanate, water, an encapsulated blowing agent, and a reaction catalyst, wherein the encapsulated blowing agent comprises a shell and a core, said shell comprising a polymer having a melting point above the inital reaction temperature (preferably between about 100° F. and about 250° F.) and said core comprising a gaseous blowing agent, said water forming carbon dioxide in said reaction mixture at said reaction-temperature to cause partial foaming of said reaction mixture, and (b) rupturing the shell of said encapsulated blowing agent by heating said shell to within said temperature range to release the gaseous blowing agent or blowing agent precursor and cause blowing by said blowing agent in order to complete the foaming of said reaction mixture to form a polyurethane foam having a desired softness as measured by an indentation force deflection of between about 8 and about 30 pounds per fifty square inches at 25% deflection as measured by ASTM 3574-86.

In another aspect, the present invention relates to a composition comprising a polyol and an encapsulated blowing agent or encapsulated blowing agent precursor.

In yet another aspect, the present invention relates to a process for forming and cooling a polyurethane foam which comprises the steps of:

(a) reacting a reaction mixture comprised of a polyol, an organic isocyanate, a water blowing agent, a reaction catalyst and encapsulated water, said encapsulated water comprising a polymer shell and a water core, said reaction mixture releasing heat by means of a reaction exotherm during the polyurethane-forming reaction to provide a hot polyurethane foam, and (b) melting said polymer using said reaction exotherm (preferably at a temperature of between about 150° F. and about 350° F.) in order to rupture said shell, thus releasing said water into said hot polyurethane foam, thus cooling said hot foam by virtue of the vaporization of said water to provide a cooled polyurethane foam.

These and other aspects will become apparent upon reading the following detailed description of the invention.

DETAILED DESCRIPTION OF THE EMBODIMENT

It has now been surprisingly found in accordance with the present invention that flexible polyurethane foams are suitably produced utilizing encapsulated gaseous blowing agent(s) to supplement the primary blowing action provided by water (which reacts to form a carbon dioxide blowing agent during the urethane-forming reaction) in the manufacture of water-blown polyurethane foam wherein the water is typically employed in an amount of up to 6 parts per hundred parts of polyol ("phr"). The supplemental blowing agent facilitates the production of a foam having the desired density and degree of softness without the use of undesireable CFC or other volatile organic blowing agents and also moderates the reaction temperature. Alternatively, when using encapsulated water as a coolant in making an all-water blown foam, the amount of water used to blow the foam can be up to 8 phr without excessive reaction exotherm.

The present invention is particularly significant since it provides methodology for avoiding the use of chlorofluorocarbon or other volatile organic blowing agents while achieving scorch free foam having a desired density.

Thus, the use of the encapsulated gaseous blowing agent in accordance with the present invention enables the production of a soft foam having a desired density of no greater than 2 pounds per cubic foot ("pcf"), preferably between 0.9 and 1.5 pcf, without any significant scorching of the foam which tends to occur when an "all-water-blown" foam is fabricated at very low density.

The "softness" of the foam is suitably measured in accordance with ASTM D 3574-86, and preferably the foams made in accordance with the present invention have a softness as measured by this ASTM test of between about 8 and about 30 pounds per fifty square inches of foam at a 25% deflection.

In another aspect, it has also been surprisingly found that encapsulated water can suitably be incorporated into a polyurethane-forming reaction mixture in order to provide cooling of the reaction exotherm via water evaporation upon rupture of the water-containing capsules after the urethane-forming reaction is complete.

Although a wide range of capsule sizes are suitably utilized in accordance with the present invention, the capsules are preferably individually less than 10 microns in diameter, and more preferably they are microcapsules having a submicron particle size. The capsules suitably employ a polymer shell having a melting point preferably within the range of between about 100° F. and about 250° F. for the encapsulated gaseous blowing agents, and a preferred temperature of between about 150° F. and about 350° F. when using encapsulated water. A preferred polymer for use in the preparation of the shell is a urea-formaldehyde copolymer, although a wide variety of other polymers having the desired melting point can suitably be used, such as for example a natural polymer such as methylcellulose, succinylated gelatin, waxes, paraffin etc., a synthetic polymer such as polyvinyl alcohol, polyethylene, polyvinyl chloride etc., or a synthentic elastomer such as neoprene, acrylonitrile, polysiloxane and combinations thereof.

In a preferred embodiment, a "one-shot" method of foam fabrication is employed, whereby the isocyanate containing stream (commonly referred to as the "A-side") and the polyol-containing and catalyst-containing stream (commonly referred to as the "B-side") are mixed. Each of these streams are preferably liquids in which all of the various additives (except the $CO_2$ microcapsules) are preferably soluble, although dispersions utilizing solid components can be employed if desired. In accordance with a more preferred embodiment of the present invention, the B-side contains polyol, encapsulated blowing agent, water, and a surfactant to assist in foam cell formation.

A typical "B-side" formulation is prepared by blending:
POLY-G 32-56, a product of Olin Corporation; 100 grams
L-620 (a silicone surfactant), a liquid product of Union Carbide Corporation; 1.1 grams
Dimethylethanolamine (catalyst), a product of Air Products; 0.18 grams
Water in an amount of 0.1 to 8 parts per 100 parts of polyol
Encapsulated gaseous blowing agent in an amount equal to the amount of blowing agent being replaced.

After thorough mixing of this blend at room temperature, the blend forms a dispersion having a viscosity of about 300 cps at room temperature.

The polyols which are used in the subject invention are well known in the art and are preferably those referred to as polyether polyols and/or polyester polyols or a combination thereof. The polyether polyols are prepared by the reaction of an alkylene oxide with polyhydric or polyamine-containing compounds, or mixtures thereof. Alkylene oxides which may be employed in the preparation of the polyols of the present invention include ethylene oxide, propylene oxide, butylene oxide, styrene oxide and the like. Halogenated alkylene oxides may also be used such as epichlorohydrin, 3,3,3-trichlorobutylene oxide, etc. Mixtures of any of the above alkylene oxides may also be employed. The preferred alkylene oxide is propylene oxide, or a mixture of propylene oxide with ethylene oxide.

Polyoxyalkylene polyether polyols are preferred and generally contain either primary or secondary hydroxyl groups, or mixtures thereof. These polyols are suitably prepared by reacting an active-hydrogen containing compound, such as polyhydric compounds or polyamines, with the above-described alkylene oxides. Useful polyhydric compounds include ethylene glycol, propylene glycol, diethylene glycol, dipropylene glycol, glycerol, pentaerythritol, sorbitol, sucrose, methyl glucoside, glucose, etc. Polyamine compounds which may be reacted with the alkylene oxide to prepare amine-based polyols include mono-, di-, and triethanol amine, ethylene diamine, diethylene diamine, toluene diamine, etc. These polyhydric alcohols and polyamine compounds can be reacted separately with alkylene oxides or they can be pre-mixed in the preparation of polyether polyol mixtures or blends. Preferred polyester polyols are those based on terephthalic, phthalic, isophthalic, adipic, succinic, glutaric, fumaric acid(s), and combinations thereof, and the like.

Preferably, the polyol is employed in a proportion corresponding to between about 0.8 and about 1.1 equivalents per equivalent of polyisocyanate.

By "equivalents" of polyol is meant the molecular weight divided by the number of hydroxyl groups present in the molecule. The equivalent weight is expressed in whatever units, i.e., grams, pounds, tons, etc., are used to designate the amounts of the other components of the reaction mixture. Similarly, the term "equivalent" used in relation to the polyisocyanate has its usually accepted meaning, namely, the molecular weight of the polyisocyanate, in whatever units are used to designate the amounts of the various components of the reaction mixture, divided by the number of isocyanate groups present in the molecule.

The polyisocyanate employed in the preparation of the cellular polymers of the invention can be any of the polyisocyanates, organic and inorganic, known to be useful in the art of polymer formation. Such polyisocyanates are commonly employed in the preparation of polyurethanes by reaction with compounds containing two or more active hydrogen-containing groups.

Illustrative of such polyisocyanates are 2,4-tolylene diisocyanate, 2,6-tolylene diisocyanate, 4,4'-methylenebis(phenyl isocyanate), dianisidine diisocyanate, tolidine diisocyanate, hexamethylene diisocyanate, m-xylene diisocyanate 1,5-napthalene diisocyanate, p-phenylene diisocyanate 1,5-napthalene diisocyanate, p-phenylene diisocyanate, 1,4-diethylbenzene diisocyanate and the like. Mixtures of two or more of the above isocyanates can be used, such as mixtures of the 2,4- and 2,6-isomers of tolylene diisocyanate, mixture of the 2,4'- and 4,4'-isomers of methylenebis(phenyl isocyanate) and the like. In addition to the 4,4'-methylenebis (phenyl isocyanate) or mixtures of the 2,4'-isomer and 4,4'-isomer thereof which are employed as the isocyanate component, there can also be used modified forms of these isocyanates. For example, there can be used 4,4'-methylenebis(phenyl isocyanate), or an admixture thereof with a minor amount of the 2,4'-isomer, which has been treated to convert a minor proportion, generally less than 15 percent by weight of the starting material, to an artifact of said starting material. For example, the polyisocyanate component can be methylenebis(-phenyl isocyanate) which has been converted to a stable liquid at temperatures of about 15° C. or higher.

Illustrative of another modified form of 4,4'-,methylenebis(phenyl isocyanate) which can form the polyisocyanate component is the product obtained by treating the former compound, or mixtures thereof with small portions of 2,4'-isomer, with a minor portion of a carbodimide such as diphenylcarbodiimide. In accordance with said process, a minor proportion of the methylenebis(phenyl isocyanate) is converted to the corresponding isocyanato-carbodiimide and there is obtained a mixture of a major proportion of unchanged starting material and a minor proportion of said isocyanato-substituted carbodimide.

Preferred as the polyisocyanate component is TDI.

Amine catalysts useful in the polyurethane-forming reaction include tertiary amines such as: N,N-dialkylpiperazines such as N,N-dimethylpiperazine, N,N-diethylpiperazine and the like; trialkylamines such as trimethylamine, triethylamine, tributylamine and the like; 1,4-diazabicyclo(2—2—2) octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine; N,N',N"-trialkylaminoalkylhexahydrotriazines such as N,N'N"-tris(dimethylaminomethyl)-hexahydrotriazine, N,N',N"-tris(dimethylaminoethyl)hexahydrotriazine, N,N'N"-tris(dimethylaminopropyl)hexahydrotriazine, N,N',N"-tris(diethylaminoethyl) hexahydrotriazine, N,N'N"-tris(diethylaminopropyl) hexahydrotriazine and the like; mono-, di-, and tri-(dialkylaminoalkyl) monohydric phenols or thiophenols such as 2-(dimethylaminomethyl)phenol, 2-dimethylaminobutyl)phenol, 2-(diethylaminoethyl)phenol, 2-(diethylaminobutyl)phenol, 2-(dimethylaminomethyl)thiophenol, 2-(diethylaminoethyl)thiophenol, 2,4-bis-(dimethylaminoethyl)phenol, 2,4-bis(dipropylaminobutyl)phenol, 2,4-bis(dipropylaminoethyl)phenol, 2,4-bis(dimethylaminoethyl)thiophenol, 2,4-bis(diethylaminopropyl)triophenol, 2,4-bis(dipropylaminoethyl)-thiophenol, 2,4,6-tris(dimethylaminoethyl)phenol, 2,4,6-tris(diethylaminoethyl)phenol, 2,4,6-tris(dipropylaminomethyl)phenol, 2,4,6-tris(diethylaminoethyl)thiophenol, 2,4,6-tris(dimethylaminoethyl) thiophenol and the like; N, N, N'N'-tetraalkylalkylenediamines such as N,N,N',N'-tetramethyl-1,3-propane diamine, N,N,N',N'-tetramethyl-1,3-butanediamine, N,N,N',N'-tetramethylethylenediamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N',N'-tetraalkylguanidines such as N,N,N',N'-tetramethylguanidine, N,N,N',N'-tetraethylguanidine and the like. The tertiary amines are suitably used as an intermediate in the preparation of the desired acid blocked catalyst, and are also suitably optionally employed to supplement the acid blocked amine catalyst.

If desired, any organometallic compound known to be a catalyst in the reaction between an isocyanato group and an active hydrogen-containing group can be employed as a supplemental catalyst in the compositions of the present invention. Such catalysts include the organic acid salts of, and the organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium.

The preferred group of said organometallic derivatives is that derived from tin. Examples of this preferred group are: dibutyltin diacetate, dibutyltin dilaurate, stannous octoate, stannous oleate, and the like. Commercial blends of tin catalyst with an amine catalyst are available, for example, as DABCO 33-LV, a product of Air Products Corporation.

Optional additives such as dispersing agents, cell stabilizers, surfactants, flame retardants, and the like, which are commonly employed in the fabrication of polymer foams, can be employed in the process of the invention. For example, the well-known phosphorus-based flame retardant additives may be used if flame retardancy is desired. These phosphate additives generally do not adversely affect the physical properties of the foam even if they are hydrolyzed and/or physically removed from the foam since these additives are not part of the foam backbone. As another illustration, a finer cell structure may be obtained if organosilicone polymers are used as surfactants in the reaction mix.

Other optional additives, such as inorganic and organic fillers, can be employed in the process of this invention. Illustrative inorganic fillers are calcium carbonate, barium sulfate, silica, glass, antimony oxides, etc. Illustrative organic fillers are the various polymers, copolymers of vinyl chloride, vinyl acetate, acrylonitrile, styrene, melamine, partially oxyalkylated melamine, etc. Organic esters can also be employed if desired. Particularly preferred esters are those derived from dicarboxylic acids such as oxalic, malonic, succinic, glutaric, maleic, phthalic, isophthalic and terephthalic acids. The use of an organic filler, particularly isophthalic and/or terephthalic esters, is preferred in the composition of the present invention since these organic fillers are liquid and soluble in the "B-side".

It is preferred in preparing the polyurethane foams of the invention to include in the foam forming reaction mixture a small proportion of a conventional surfactant in order to improve the cell structure of the resulting foam. Typical such surfactants are the silicones and the siloxaneoxyalkylene block copolymers. U.S. Pat. No. 2,834,748 and T. H. Ferrigno. Rigid Plastic Foams (New York:Reinhold Publishing Corp., 1963), pp. 38–42, disclose various surfactants which are useful for this purpose. The surfactant choice, while not essential to the present invention, does have an effect upon the cell structure in the resulting polyurethane foam, and the recently-introduced "high efficiency" surfactants are desireably employed.

Preferred surfactants are the following:

| | |
|---|---|
| L-620 | |
| L-6202 | UNION CARBIDE |
| Y-10390 | |
| DC-5160 | |
| DC-198 | AIR PRODUCTS |
| DC-5125 | |
| DC-1315 | |
| B-8021 | GOLDSCHMIDT |

Generally up to 2.5 parts by weight (preferably 0.8–1.5 parts) of the surfactant are employed per every 100 parts of the polyol reactant.

The cellular products of the invention can be employed for all the purposes for which the currently produced cellular products are conventionally employed, but as noted above are particularly suitable when using polyether polyols for applications where excellent softness and low scorch is required.

The following examples are intended to illustrate, but in no way limit, the scope of the present invention.

COMPARATIVE EXAMPLE A

Preparation of a Foam Using Methylene Chloride as a Blowing Agent

To 100 grams of Poly-G® 32–56 in a one quart plastic cup is added 9.5 grams of methylene chloride, 5.2 grams of water, 0.18 grams of DMEA, and 1.1 grams of silicone surfactant. The contents are stirred with a high speed high shear mixer for approximately 20 seconds. 0.64 grams of Dabco T-10 is added to the mixture and it is mixed again for approximately 10 seconds. The stirrer is then started again for approximately 10 seconds. The stirrer is then started again and 67.6 grams of TDI-80 is added while the mixture was still being stirred. After eight seconds the contents of the cup was poured into a cake box. The anticipated foam density is 1.0 pcf; however, the methylene chloride is an undesirable blowing agent from an environmental and toxicity standpoint.

EXAMPLE 1

Proposed Example Using an Encapsulated Blowing Agent

The same procedure as is used in example 1 is proposed for Example 1 above. Encapsulated $CO_2$ (7.03 GM) is substituted for the methylene chloride. The resulting foam has a density of 1.1 pcf.

EXAMPLE 2

Proposed Example Using a Reduced Amount of Water

The same procedure as is used in example 1 above. Encapsulated $CO_2$ is substituted for all of the methylene chloride and 1.0 phr of water. Water concentration is reduced from 5.2 phr to 4.2 phr of water. Water concentrations is reduced from 5.2 phr to 4.2 phr and encapsulated $CO_2$ concentration is increased to 10.5 phr. TDI-80 concentration is reduced to 55.18 phr to compensate for the lower water in the formula. Foam density is 1.0 pcf.

EXAMPLE 3

Cooling of the Reaction Exotherm Using Encapsulated $H_2O$

The same procedure as in Example 1 is used. The formulation is changed: water is increased from 5.2 gm to 7.2 gm and corresponding TDI is increased to 86.93 gm, methylene chloride is reduced to zero, and 7.4 gm encapsulated water is added. The 7.4 gm encapsulated water does not include the wt. of capsules, and the encapsulated water serves to cool the high temperature generated by the reaction exotherm. The foam has a density of 1.0 pcf and same maximum exotherm temperature as in Example 1.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A process for producing a flexible polyurethane foam which comprises the steps of:
   (a) reacting, at an initial reaction temperature selected from within a temperature range of between about 70° F. and about 150° F., a reaction mixture comprised of a polyol, an organic isocyanate, water, an encapsulated blowing agent, and a reaction catalyst, wherein the encapsulated blowing agent comprises a shell and a core, said shell comprising a polymer having a melting point above the initial reaction temperature, and said core comprising a gaseous blowing agent, said water forming carbon dioxide in said reaction mixture at said reaction temperature to cause partial foaming of said reaction mixture, and
   (b) rupturing the shell of said encapsulated blowing agent by heating said shell to within said temperature range to release the gaseous blowing agent or blowing agent precursor and cause blowing by said blowing agent in order to complete the foaming of said reaction mixture to form a polyurethane foam having a desired softness as measured by an indentation force deflection of between about 8 and about 30 pounds per fifty square inches at 25% deflection as measured by ASTM 3574-86.

2. The process of claim 1 wherein said core of said encapsulated blowing agent consists essentially of a gas selected from the group consisting of carbon dioxide, nitrogen, air, and combinations thereof.

3. The process of claim 1 wherein said reaction mixture contains an amount of water of between about 1 and about 8 parts per hundred parts of polyol.

4. The process of claim 1 wherein said reaction mixture also comprises a surfactant.

5. The process of claim 1 wherein said reaction catalyst additionally comprises an organotin compound.

6. The foam produced by the process of claim 1.

\* \* \* \* \*